US010952820B2

(12) United States Patent
Song et al.

(10) Patent No.: US 10,952,820 B2
(45) Date of Patent: Mar. 23, 2021

(54) SYSTEM OF MANUFACTURING ORTHODONTIC WIRE, METHOD FOR MANUFACTURING THE ORTHODONTIC WIRE USING THE SAME, AND ORTHODONTIC WIRE BENDING MACHINE FOR PERFORMING THE SAME

(71) Applicant: KOREA INSTITUTE OF MACHINERY & MATERIALS, Daejeon (KR)

(72) Inventors: Joon-Yub Song, Daejeon (KR); Yong-Jin Kim, Daejeon (KR); Jae-Hak Lee, Sejong-si (KR); Seung-Man Kim, Daejeon (KR); Youn Ho Jung, Seoul (KR); Kwang Sun Choi, Seoul (KR)

(73) Assignee: KOREA INSTITUTE OF MACHINERY & MATERIALS, Daejeon (KR)

(*) Notice: Subject to any disclaimer, the term of this patent is extended or adjusted under 35 U.S.C. 154(b) by 91 days.

(21) Appl. No.: 16/003,918

(22) Filed: Jun. 8, 2018

(65) Prior Publication Data
US 2018/0353266 A1    Dec. 13, 2018

(30) Foreign Application Priority Data

Jun. 8, 2017   (KR) ................ 10-2017-0071503
May 3, 2018   (KR) ................ 10-2018-0051106
Jun. 4, 2018   (KR) ................ 10-2018-0064274

(51) Int. Cl.
*A61C 7/20*    (2006.01)
*G05B 19/4097*    (2006.01)
(Continued)

(52) U.S. Cl.
CPC ............. *A61C 7/20* (2013.01); *A61C 7/002* (2013.01); *A61C 9/0053* (2013.01);
(Continued)

(58) Field of Classification Search
CPC ......... A61C 7/20; A61C 9/0053; A61C 7/002; G05B 19/4097; G05B 2219/37205; G05B 2219/35012
(Continued)

(56) References Cited

U.S. PATENT DOCUMENTS 5,454,717 A   10/1995   Andreiko et al.
6,612,143 B1   9/2003   Butscher et al.
(Continued)

FOREIGN PATENT DOCUMENTS

EP           2 736 444 A1    6/2014
KR   10-2011-0096961 A      8/2011
(Continued)

OTHER PUBLICATIONS

Extended European Search Report dated Feb. 13, 2019, corresponding to European Application No. 18176652.8 citing the above reference(s).

*Primary Examiner* — Jigneshkumar C Patel
(74) *Attorney, Agent, or Firm* — Hauptman Ham, LLP

(57) ABSTRACT

In a system of manufacturing an orthodontic wire, a method for manufacturing the orthodontic wire using the system, and an orthodontic wire bending machine for performing the system, the system includes a teeth data obtaining part, a simulating part, a calculating part and a wire manufacturing part. The teeth data obtaining part obtains present teeth data of a patient. The simulating part generates final teeth data. The calculating part compares a predetermined threshold to a compared value between the present teeth data of the patient and the final teeth data. The wire manufacturing part selectively manufactures a wire for an orthodontic process or a wire for a dentition maintenance process based on a compared result of the calculating part.

7 Claims, 9 Drawing Sheets

(51) Int. Cl.
*A61C 7/00* (2006.01)
*A61C 9/00* (2006.01)

(52) U.S. Cl.
CPC ............... *G05B 19/4097* (2013.01); *G05B 2219/35012* (2013.01); *G05B 2219/37205* (2013.01)

(58) Field of Classification Search
USPC ........................................................ 700/159
See application file for complete search history.

(56) References Cited

U.S. PATENT DOCUMENTS

| | | | |
|---|---|---|---|
| 2004/0072120 A1 | 4/2004 | Lauren | |
| 2006/0263740 A1 | 11/2006 | Sporbert et al. | |
| 2007/0072144 A1* | 3/2007 | Imgrund | A61C 7/00 433/24 |
| 2011/0270583 A1* | 11/2011 | Getto | A61C 7/002 703/1 |

FOREIGN PATENT DOCUMENTS

| | | |
|---|---|---|
| KR | 10-1200014 B1 | 11/2012 |
| KR | 10-2015-0048882 A | 5/2015 |

* cited by examiner

SYSTEM OF MANUFACTURING ORTHODONTIC WIRE, METHOD FOR MANUFACTURING THE ORTHODONTIC WIRE USING THE SAME, AND ORTHODONTIC WIRE BENDING MACHINE FOR PERFORMING THE SAME

CROSS REFERENCE TO RELATED APPLICATION

This application claims priority from Korean Patent Application Nos. 10-2017-0071503, 10-2018-0051106, and 10-2018-0064274 filed on Jun. 8, 2017, May 3, 2018, and Jun. 4, 2018, respectively, which are hereby incorporated by reference for all purposes as if fully set forth herein.

BACKGROUND

1. Field of Disclosure

The present disclosure of invention relates to a system of manufacturing an orthodontic wire, a method for manufacturing the orthodontic wire using the system, and an orthodontic wire bending machine for performing the system, and more specifically the present disclosure of invention relates to a system of manufacturing an orthodontic wire, a method for manufacturing the orthodontic wire using the system, and an orthodontic wire bending machine for performing the system, capable of manufacturing the orthodontic wire more fast, enhancing patient suitability, considering steps of orthodontic treatment and a difference between orthodontic processes and dentition maintenance processes, considering an elastic restoring force of the orthodontic wire to manufacturing the orthodontic wire more accurately and precisely, and manufacturing a customized orthodontic wire.

2. Description of Related Technology

Orthodontic treatment is performed to form or arrange dentition uniformly, and in the orthodontic treatment, a bracket is attached to the teeth and an orthodontic archwire is attached to the bracket, and thus positions, angles and directions of the teeth are properly restored or arranged.

Recently, a setup model including an ideal state of the teeth is simulated and the bracket and the orthodontic archwire are designed using a computer simulated program.

European Patent No. 2736444 (ORTHONDONTIC ARCHWIRES WITH REDUCED INTERFERENCE AND RELATED METHODS) discloses that an arch shape is obtained to coincide with the position of the teeth, and a customized orthodontic wire having a plurality of segments is manufactured.

Here, in European Patent No. 2736444, when a bending position and a bending angle are inputted, a conventional rectangular wire is bended using an conventional bending machine to manufacturing the customized orthodontic wire.

The above-mentioned conventional technologies, a precise torque and an in-out control may be provided to the customized orthodontic wire, but the conventional rectangular wire is not easy to be manufactured and the bending processes are limited to increase accuracy or precision.

In addition, in manufacturing the conventional rectangular wire, an accurate or precise bending is hard to be performed due to an elasticity of a material of the wire.

For example, Nitinol based wire normally used for the orthodontic wire is hard to be bent accurately or precisely without heating the wire, due to a relatively high restoring force.

Further, the orthodontic treatment is not performed with a single treatment, and a proper wire should be used at each step of the orthodontic treatment. However, the conventional orthodontic treatment has never considered this technical features in the orthodontic treatment.

In addition, the orthodontic treatment includes an orthodontic process and a dentition maintenance process. In the orthodontic process, the teeth are re-arranged, re-positioned, re-rotated to be formed uniformly, and in the dentition maintenance process, the uniformly formed teeth is maintained with distortion. However, in manufacturing the wire used for the orthodontic treatment, a difference between the orthodontic process and the dentition maintenance process is not considered, and thus a system or a method considering the difference should be developed.

Furthermore, the orthodontic wire is normally manufactured manually, and thus the quality of the orthodontic wire depends on a skill of a worker and a working price and working time are increased. To solve the above-mentioned problem, U.S. Pat. No. 6,612,143 discloses a bending robot automatically bending the wire.

However, the conventional bending robot has a complex structure and is very expensive.

Related prior arts are European Patent No. 2736444 "ORTHODONTIC ARCHWIRES WITH REDUCED INTERFERENCE AND RELATED METHODS", and U.S. Pat. No. 6,612,143 "ROBOT AND METHOD FOR BENDING ORTHODONTIC ARCHWIRES AND OTHER MEDICAL DEVICES."

SUMMARY

The present invention is developed to solve the above-mentioned problems of the related arts.

The present invention provides a system of manufacturing an orthodontic wire capable of manufacturing the orthodontic wire more fast, enhancing patient suitability, considering steps of orthodontic treatment and a difference between orthodontic processes and dentition maintenance processes, considering an elastic restoring force of the orthodontic wire to manufacturing the orthodontic wire more accurately and precisely, and manufacturing a customized orthodontic wire.

The present invention also provides a method for manufacturing the orthodontic wire using the system.

The present invention also provides an orthodontic wire bending machine for performing the system.

According to an example embodiment, the system of manufacturing an orthodontic wire includes a teeth data obtaining part, a simulating part, a calculating part and a wire manufacturing part. The teeth data obtaining part obtains present teeth data of a patient. The simulating part generates final teeth data. The calculating part compares a predetermined threshold to a compared value between the present teeth data of the patient and the final teeth data. The wire manufacturing part selectively manufactures a wire for an orthodontic process or a wire for a dentition maintenance process based on a compared result of the calculating part. The teeth of the patient is corrected at the orthodontic process, and a set of the teeth of the patient is maintained at the dentition maintenance process.

In an example, the wire manufacturing part may manufacture the wire for the orthodontic process, when the compared value between the present teeth data of the patient and the final teeth data are larger than the predetermined threshold.

In an example, the system may further include a target data generating part generating target data at each of orthodontic steps, based on the present teeth data of the patient and the final teeth data, and a target data selecting part selecting target data of the patient, from the target data at each of the orthodontic steps generated by the target data generating part.

In an example, the teeth data obtaining part may obtain teeth data of the patient after being treated by the wire for the orthodontic process, as the present teeth data of the patient. The target data selecting part may select target data the closest to the final teeth data, by comparing the present teeth data of the patient to the target data at each of the orthodontic steps.

In an example, the wire manufacturing part may manufacture the wire for the dentition maintenance process, when the compared value between the present teeth data of the patient and the final teeth data.

In an example, the system may further include a correcting part generating a compensation algorithm considering an elastic restoring force of the wire for the dentition maintenance process, when the wire for the dentition maintenance process is manufactured.

In an example, the correcting part may generate the compensation algorithm, by using predetermined elastic restoring force data based on kinds of the wires for the dentition maintenance process, or by measured elastic restoring force of the wire for the dentition maintenance process.

According to another example embodiment, a method for manufacturing the orthodontic wire includes obtaining present teeth data of a patient. Final teeth data are generated. A predetermined threshold is compared to a compared value between the present teeth data of the patient and the final teeth data. A wire for an orthodontic process or a wire for a dentition maintenance process is selectively manufactured, based on a compared result of the comparing. The teeth of the patient is corrected at the orthodontic process. A set of the teeth of the patient is maintained at the dentition maintenance process.

In an example, the method further include generating target data at each of orthodontic steps, based on the present teeth data of the patient and the final teeth data.

In an example, the wire for the orthodontic process may be manufactured when the compared value between the present teeth data of the patient and the final teeth data are larger than the predetermined threshold. The wire for the dentition maintenance process may be manufactured when the compared value between the present teeth data of the patient and the final teeth data are less than the predetermined threshold.

In an example, manufacturing the wire for the orthodontic process may include selecting the target data of the patient, from the target data at each of the orthodontic steps, manufacturing the wire for the orthodontic process, based on the target data of the patient, and obtaining the target data of the patient after each of the orthodontic step is finished.

In an example, the method may further include considering the obtained target data of the patient after each of the orthodontic step is finished as the present teeth data of the patient, and then comparing the predetermined threshold to the compared value between the present teeth data of the patient and the final teeth data again.

In an example, in selecting the target data of the patient, the target data the closest to the final teeth data may be selected, by comparing the present teeth data of the patient to the target data at each of the orthodontic steps.

In an example, manufacturing the wire for the dentition maintenance process may include selecting the final teeth data as the target data of the patient, generating a compensation algorithm considering an elastic restoring force of the wire for the dentition maintenance process, and manufacturing the wire for the dentition maintenance process, based on the final teeth data and the compensation algorithm.

In an example, in generating the compensation algorithm, the compensation algorithm may be generated by using predetermined elastic restoring force data based on kinds of the wires for the dentition maintenance process.

According to still another example embodiment, an orthodontic wire bending machine includes a providing unit, a bending unit, a guide zig and a cutting unit. The providing unit provides a wire. The bending unit is disposed at a front of the providing unit, and includes a fixing part fixing the wire and a bending part bending the wire fixed by the fixing part. The guide zig includes upper and lower zigs. The upper and lower zigs overlap with each other by a predetermined gap, form a guide groove in which the bending unit is disposed, and fix the wire between the upper and lower zigs. The cutting unit is disposed at a front of the bending unit, and cuts the wire bent by the bending unit.

In an example, wherein the bending part may include a bending bar selectively disposed at each of both sides of the wire for bending the wire. The bending bar may move along a feeding direction of the wire to change a rotational center of the wire.

In an example, the fixing part may include first and second zigs facing each other, the wire being disposed between the first and second zigs, a pair of fixing tips fixing the wire when the wire passes between the pair of tips, and a guide pin disposed beneath the wire, extending substantially perpendicular to a feeding direction of the wire, and making contact with the wire.

In an example, the upper zig may include a transparent material. The lower zig may include first and second lower elements detachably combined with each other with respect to an interface. The first lower element may rotate with respect to the second lower element, to downwardly move the wire fixed between the upper and lower zigs.

In an example, the orthodontic wire bending machine may further include a vision feedback controller fed back a bending angle of the wire fixed between the upper and lower zigs, a laser heating part locally melting the wire positioned at the guide groove, and a sensing part correcting a length of the wire provided by the providing unit.

According to the present example embodiments, it is decided whether an orthodontic process is necessary or a dentition maintenance process is necessary, based on a state of patient teeth, and a wire matching with the decision is manufactured. Thus, more suitable treatment may be performed and the orthodontic treatment may be more effective.

Here, target data are generated corresponding to each orthodontic step, and a proper step is determined based on the state of the patient teeth and the target data corresponding the proper step are generated to manufacture a proper orthodontic wire. Thus, technical features of the orthodontic treatment in which a plurality of steps, not a single step, is necessary to complete the orthodontic treatment, are considered and thus the orthodontic treatment may be more effective.

In addition, in a real orthodontic treatment, the orthodontic process may be further performed than expected or targeted, and thus at the end of each orthodontic step, the state of the patient teeth is compared with a predetermined threshold and then it is decided whether the orthodontic process is necessary or the dentition maintenance process is necessary. Thus, the proper wire may be manufactured considering the state of the patient teeth, and the orthodontic treatment may be more effective.

Here, regarding characteristics of the wire used in the real orthodontic treatment, more proper wire may be manufactured considering that an elastic restoring force of the wire used at the dentition maintenance process is higher than that of the wire used at the orthodontic process. Thus, the orthodontic treatment may be more effective.

In other words, in the dentition maintenance process, the maintenance of the dentition is the final target and thus the wire should be manufactured considering the elastic restoring force of the wire. Thus, the wire may be previously prevented from being distorted or deformed to enhance the effect of the dentition maintenance process.

Here, considering the elastic restoring force of the wire, various kinds of data may be used according to a kind of the wires used for the dentition maintenance, and thus compensated algorithm may be generated more correctly.

Further, according to the orthodontic wire bending machine of the present example embodiment, a guide groove is formed around a providing roller so that the wire is mounted on the guide groove, a position of the wire is not changed and the wire move stably without secession.

In addition, each of first and second zigs of a fixing part fixes the wire, so that the wire is fixed more stably. A distance between the first and second zigs may be controlled by a distance control unit, so that various kinds of wire having various kinds of diameters may be easily fixed. Thus, the wire for the orthodontic treatment may be manufactured more easily, more cheaply and more efficiently.

In addition, a cutting unit cutting the wire is combined with a linear moving part, and thus the cutting unit moves by the linear moving part. Thus, the cutting unit moves toward the wire for cutting, and moves from the wire after cutting, and thus the cutting unit does not interfere the bending mechanism of the wire.

In addition, the upper and lower zigs overlapping with each other and extending from a sidewall of the providing unit, forms a guide groove at which the bending unit is positioned, and thus bent portions of the wire may be fixed between the upper and lower zigs. Thus, the wire is prevented from being sagging after being bent, and a shape of the bent wire is maintained without being additionally deformed.

In addition, the lower zig includes first and second lower elements combined with each other and rotating with each other, and thus the first lower element rotates with respect to the second lower element to downwardly move the wire after the bending.

Further, the upper zig has a transparent material, and the lower zig has an opaque material. Thus, the bent wire may be identified through the upper zig, and a vision feedback controller may confirm or control the bending of the wire through the upper zig.

In addition, the wire for the orthodontic process is normally formed by three twisted wires, and thus the wire may be distorted or deformed upwardly or downwardly when the wire is bent to left and right directions. However, in the present example embodiment, the wire is positioned and fixed by the upper and lower zigs, and thus the distortion or the deformation of the wire may be prevented.

In addition, the wire may be formed to have a stereoscopic shape different from the predetermined or intended shape. However, in the present example embodiment, the wire is fixed and positioned between the upper and lower zigs, and thus an energy for the bending is applied only for the predetermined or intended shape of the wire, and the wire may be prevented from being formed to have unexpected or unintended shape.

Furthermore, a laser heating part melts the wire positioned at the guide groove. Here, the laser heating part locally heats a very small portion of the wire, and thus moldability for the wire may be increased and the wire may be bent more accurately and precisely.

BRIEF DESCRIPTION OF THE DRAWINGS

The above and other features and advantages of the present invention will become more apparent by describing in detail the preferred embodiments thereof with reference to the accompanying drawings, in which.

DETAILED DESCRIPTION

The invention is described more fully hereinafter with Reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting of the invention.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, the embodiments of the present invention will be described in detail with reference to the accompanied drawings.

Figure 1:
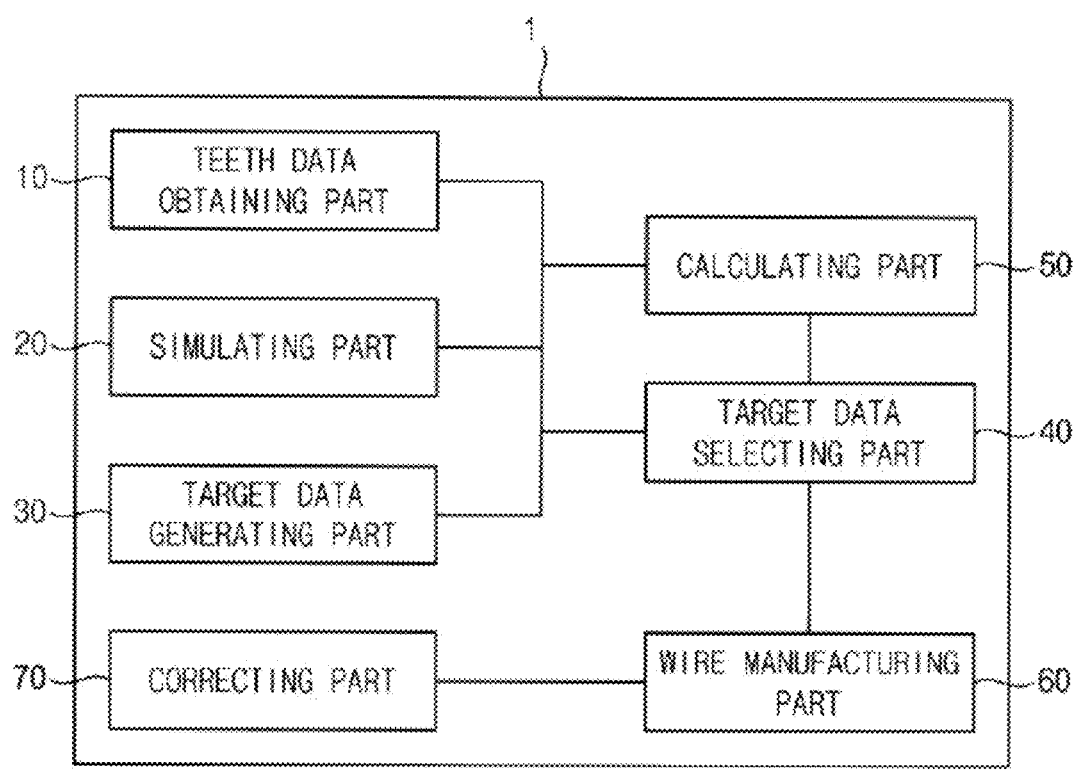
FIG. 1 is a block diagram illustrating a system of manufacturing an orthodontic wire according to an example embodiment of the present invention.
Figure 2:
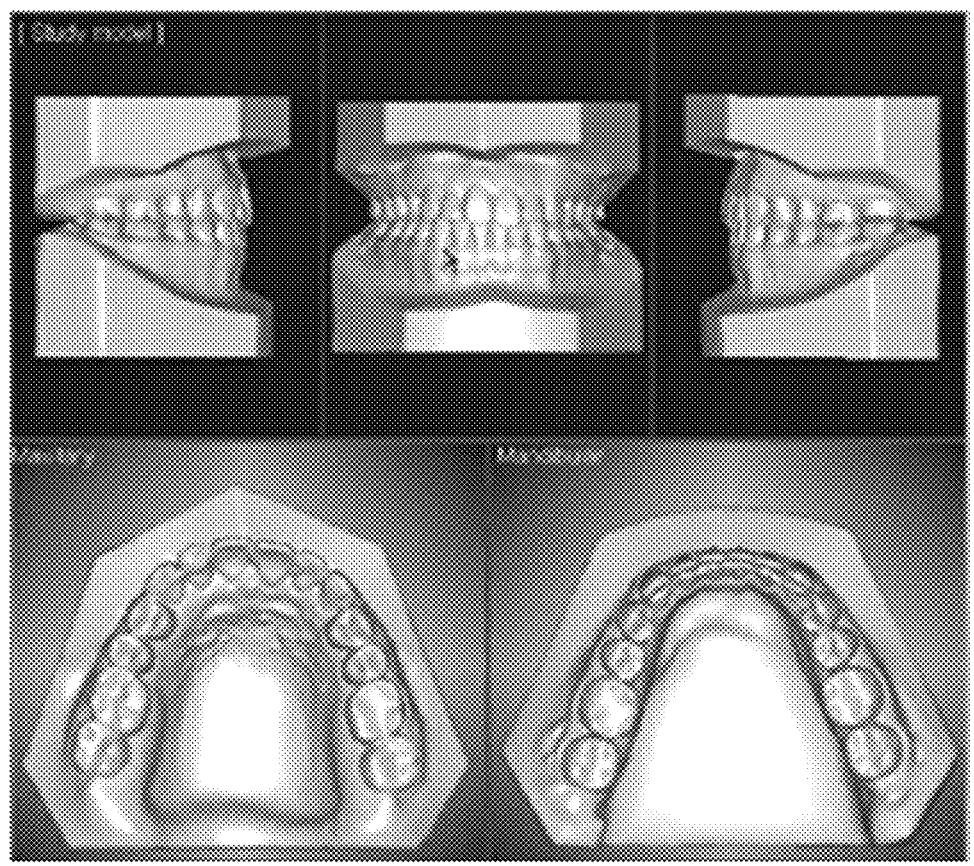
FIG. 2 is images illustrating a patient teeth information obtained by a teeth data obtaining part of FIG. 1.
Figure 3:
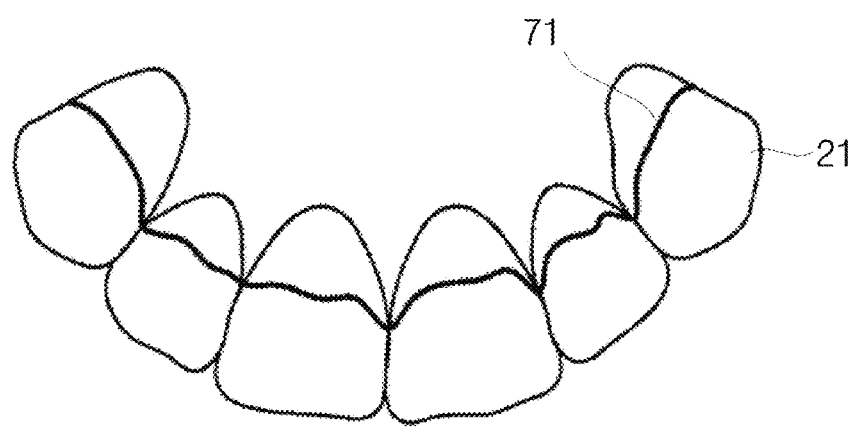
FIG. 3 is an image illustrating a wire manufactured by a wire manufacturing part and fixed to patient teeth.
Figure 4:
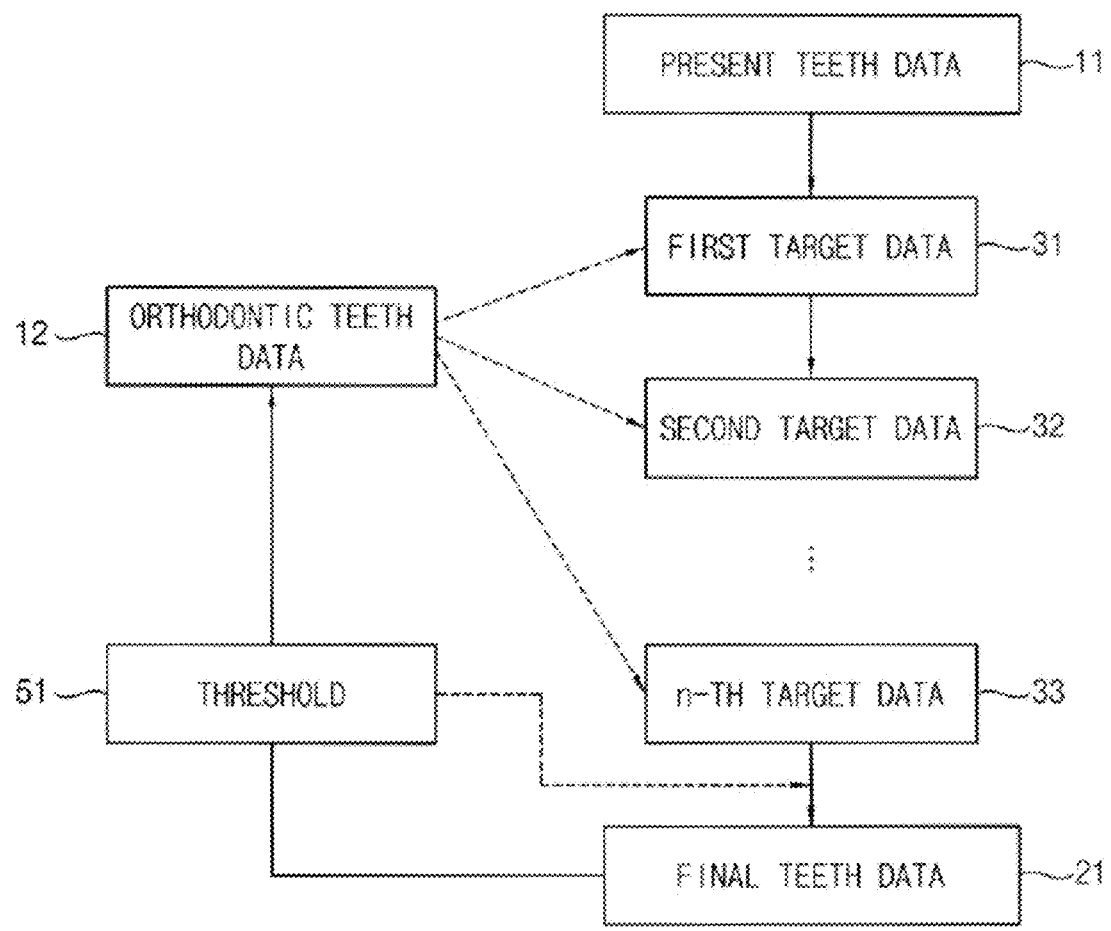
FIG. 4 is a block diagram illustrating functions of a target data generating part and a target data selecting part.

FIG. 1 is a block diagram illustrating a system of manufacturing an orthodontic wire according to an example embodiment of the present invention. FIG. 2 is images illustrating patient teeth information obtained by a teeth data obtaining part of FIG. 1. FIG. 3 is an image illustrating a wire manufactured by a wire manufacturing part and fixed to patient teeth. FIG. 4 is a block diagram illustrating functions of a target data generating part and a target data selecting part.

Referring to FIG. 1, the system of manufacturing an orthodontic wire according to the present example embodiment includes a teeth data obtaining part 10, a simulating part 20, a target data generating part 30, a target data selecting part 40, a calculating part 50, a wire manufacturing part 60 and a correcting part 70.

The teeth data obtaining part 10 obtains present teeth data 11 of a patient. Here, the present teeth data 11 of the patient may be defined as the present teeth data of the patient before an orthodontic process, or as the teeth data of the patient after each of orthodontic steps of the orthodontic process mentioned below is finished when the orthodontic process is performed.

For example, the teeth data obtaining part 10 obtains the teeth data of the patient before the orthodontic process as the present teeth data of the patient, or alternatively obtains the teeth data of the patient after each of the orthodontic steps is finished.

Here, as illustrated in FIG. 2, the teeth data obtaining part 10 obtains the present teeth data of the patient, by picturing a state of patient's teeth or by scanning the state of patient's teeth using a 3D scanner.

Due to the picturing, skeleton information and soft tissue of the patient may be obtained, and the picturing may be performed by a cone-beam CT (CBCT). CBCT may decrease an amount of radioactive ray inspection and be less affected by prosthetic appliance inside of a mouth, and thus CBCT may be normally used but not limited thereto.

In addition, due to the scanning, information of a set of the teeth (dentition) and teeth may be additionally obtained. Here, an intraoral laser scanner may be used. Stereoscopic shape and size of a crown of the teeth and a dental root, a height of alveolar bone, and information of ossein of the alveolar bone may be further obtained.

For example, as the scanning, three-dimensional oral cavity scanner, computed tomography (CT) scanner, gypsum scanner, and so on may be used.

The present teeth data 11 of the patient may include pictures of the teeth of the patient, direction information for the orthodontic treatment by a doctor, a teeth model of the patient, and so on.

In addition, when the patient is in growth and development period, the present teeth data 11 may include teeth information inside of gingiva in addition to teeth information protruded from the gingiva.

The simulating part 20 simulates and generates final teeth data 21. Here, the final teeth data 21 may be defined as ideal orthodontic teeth data after the orthodontic treatment is completed based on the present teeth data 11 before the orthodontic process, and thus may be generated considering the obtained teeth data of the patient, an age of the patient, a gender of the patient and so on.

For example, in simulating and generating the final teeth data, a needless area is removed from the present teeth data 11 of the patient before the orthodontic process, the data are processed to be proper resolution and size, extracting the teeth to be treated based on an amount of secession with respect to a reference teeth shape or line, and then the teeth are enlarged, rotated, repositioned and so on to match up with the reference teeth shape or line. Thus, the final teeth data are simulated and generated. Here, information of the previous teeth treatment of the previous patient, information of the teeth treatment for average patients at each age or each gender, and so on, may be additionally used.

The final teeth data 21 generated by the simulating part 20 is illustrated in FIG. 3 as an example. In FIG. 3, a wire for a dentition maintenance process mentioned below is also illustrated, and the final teeth data 21 may be finally maintained by the wire for the dentition maintenance process.

The simulating part 20 simulates the final teeth data 21, and simulates an entire process of the orthodontic treatment, for example an entire process according to malocclusion classification, each process of initial, middle and final orthodontic processes, a proper responding process when unpredicted result is generated in the orthodontic process, and so on.

Referring to FIG. 4, the target data generating part 30 generates target data 31, 32, . . . , 33 at each of the orthodontic steps, based on the present teeth data 11 of the patient obtained by the teeth data obtaining part 10, and the final teeth data 21 generated by the simulating part 20.

Generally, in the orthodontic process, one single orthodontic wire may be hard to complete the orthodontic process, and at least one orthodontic step is necessary to complete the orthodontic process. Thus, at least one wire corresponding to each of the orthodontic steps is necessary.

Here, the number of the orthodontic steps depends on the state of the teeth of the patient and the final teeth data, and as expected, as the state of the teeth is worse, the number of the orthodontic steps is increased.

Thus, in the present example embodiment, the orthodontic steps to complete the orthodontic process are generated based on the state of the teeth of the patient and the final state of the teeth of the patient in addition to information of the previous treatment and so on, and the target data 31, 32, . . . , 33 at each of the orthodontic steps are generated.

The target data 31, 32, . . . , 33 at each of the orthodontic steps are stored as reference data to manufacture an orthodontic wire using the system for manufacturing the orthodontic wire according to the present example embodiment, and the wire corresponding to each of the orthodontic steps is manufactured by the reference data stored above.

The target data selecting part 40 selects target data of the patient, from the target data 31, 32, . . . , 33 at each of the orthodontic steps generated by the target data generating part 40.

Here, the target data selecting part 40 selects target data of the patient, from the target data 31, 32, . . . , 33 at each of the orthodontic steps, when the correcting part 70 decides the wire for the orthodontic process is necessary to be manufactured.

For example, the target data selecting part 40 selects first target data 31 among the target data 31, 32, . . . , 33, when the orthodontic process is started, which means that the teeth data obtained by the teeth data obtaining part 10 is the present teeth data 11 of the patient (an initial patient teeth data) before the orthodontic steps.

Alternatively, the target data selecting part 40 selects target data by comparing the target data 31, 32, . . . , 33 to an orthodontic teeth data 12 of the patient, when the orthodontic process is performing, which means that the teeth data obtained by the teeth data obtaining part 10 is the orthodontic teeth data 12 of the patient in the middle of the orthodontic steps.

Here, the target data the closest to the orthodontic teeth data 12 of the patient may be selected. However, when the orthodontic teeth data 12 of the patient are the more processed data compared to the selected target data the closest to the orthodontic teeth data 12, the target data next to the selected target data the closest to the orthodontic teeth data 12 may be finally selected. Alternatively, when the orthodontic teeth data 12 of the patient are the less processed data compared to the selected target data the closest to the orthodontic teeth data 12, the selected target data the closest to the orthodontic teeth data 12 may be finally selected or the target data next to the selected target data the closest to the orthodontic teeth data 12 may be finally selected. Here, the more processed data means that the orthodontic process is more performed than expected, and the less processed data means that the orthodontic process is less performed than expected.

For example, referring to FIG. 4, when the orthodontic teeth data 12 which is the teeth data in the middle of the orthodontic process is decided to be the closest to the first target data 31, and when the orthodontic teeth data 12 is the more processed data than the first target data 31, the target data selecting part 40 may select the second target data 32 as the target data.

Alternatively, when the orthodontic teeth data 12 is decided to be the closest to the second target data 32, and when the orthodontic teeth data 12 is the less processed data than the second target data 32, the target data selecting part 40 may select the second target data 32 as the target data, or the target data selecting part 40 may select the third target data (not shown) as the target data based on the similarity between the orthodontic teeth data 12 and the second target data 32.

The calculating part 50 compares a predetermined threshold 51 to a compared value between the present teeth data of the patient obtained by the teeth data obtaining part 10 and the final teethed data 21.

Here, the predetermined threshold 51 is a reference data for deciding whether a wire for the orthodontic process is manufactured or a wire for a dentition maintenance process is manufactured. In addition, the threshold 51 may be predetermined before starting the orthodontic treatment, based on various kinds of information on the teeth of the patient and so on.

As mentioned above, the orthodontic process is normally performed via the plurality of orthodontic steps, and in each of the orthodontic steps, it is decided whether an additional orthodontic step is processed or not and the target data are selected at each of the orthodontic steps. For example, when the target data selecting part 40 selects one of the first to n-th target data 31, 32, . . . , 33 in the orthodontic steps of the orthodontic process, the calculating part 50 should output the compared result to manufacture the wire for the orthodontic process corresponding to each of the orthodontic steps.

Thus, the threshold 51 should be determined such that the target data selecting part 40 selects the final teeth data 21 as the target data, not one of the first to n-th target data 31, 32, . . . , 33 in the orthodontic steps as the target data.

Thus, when the threshold 51 is the reference value deciding whether the orthodontic process is further proceeded as one of the orthodontic steps or the dentition maintenance process is started instead of the orthodontic process.

For example, when the compared value (a difference value) between the present teeth data of the patient and the final teeth data, is larger than the threshold 51, an additional orthodontic process is necessary. Here, the specific orthodontic step may be selected with the above mentioned method. However, when the compared value is less than the threshold 51, any further orthodontic process is not necessary and the dentition maintenance process should be started.

Here, the orthodontic treatment is divided into the orthodontic process and the dentition maintenance process. The orthodontic process is for correcting (moving, repositioning, twisting, rotating, distorting and so on) the teeth of the patient, and the dentition maintenance process is for maintaining the dentition (a set of teeth). Further, to perform the orthodontic process, a plurality of orthodontic steps should be performed, as mentioned above.

Accordingly, the calculating part 50 decides whether the orthodontic process is performed or the dentition maintenance process is performed, based on the threshold 51. In other words, the calculating part 50 decides whether the wire for the orthodontic process is manufactured or the wire for the dentition maintenance process is manufactured.

The wire manufacturing part 60 manufactures the wire for the orthodontic process, when the compared value between the present teeth data of the patient and the final teeth data are larger than the threshold 51.

Alternatively, the wire manufacturing part 60 manufactures the wire for the dentition maintenance process, when the compared value between the present teeth data of the patient and the final teeth data are less than the threshold 51.

The wire includes a metal, and has an elastic restoring force. Thus, even though the wire is deformed as much as a calculated value, the wire is actually deformed less than the calculated value and further as times go one the deformed wire may be restored toward the initial shape in the orthodontic treatment.

However, in the orthodontic process, even though the wire for the orthodontic process is deformed at the orthodontic step, the wire may be manufactured again in the next orthodontic step considering the deformation of the wire or the result of the orthodontic teeth, since the orthodontic process is performed via a plurality of the orthodontic steps.

Alternatively, in the dentition maintenance process, once the wire for the dentition maintenance process is manufactured, the manufactured wire is continuously used for the dentition maintenance process without changing or re-manufacturing the wire. Thus, the wire should not be deformed or should be less deformed.

Considering the characteristics of the dentition maintenance process, the wire having relatively larger elastic restoring force may be used, compared to the wire used in the orthodontic process.

Thus, in the present example embodiment, the correcting part 70 generates a compensation algorithm considering the elastic restoring force of the wire for the dentition maintenance process, when manufacturing the wire for the dentition maintenance process. Here, the correcting part 70 generates the compensation algorithm, using predetermined elastic restoring force data based on kinds of the wires for the dentition maintenance process, for example, a material, a thickness, a length and so on of the wire. Here, the predetermined elastic restoring force data may be obtained by an additional reference or by an experiment of the elastic restoring force.

For example, in manufacturing the wire, deformation value for manufacturing the wire for the dentition maintenance process is calculated and provided based on the final teeth data 21, but an actual amount of the deformation may be less than a target amount of the deformation when the wire is deformed based on the calculated deformation value because of the elastic restoring force of the wire. Thus, the correcting part 70 generates the compensation algorithm considering the elastic restoring force of the wire, to obtain the actual amount of the deformation to reach the target amount of the deformation, and then the wire for the dentition maintenance process is manufactured.

Here, as mentioned above, the compensation algorithm may be generated via measuring the elastic restoring force of each of the wires for the dentition maintenance process, in addition to via the predetermined elastic restoring force of the wire.

The compensation algorithm may also include a manufacturing mechanism for manufacturing the wire using a yielding point, when the compensation algorithm is generated via the measured elastic restoring force or the predetermined elastic restoring force.

Further, the compensation algorithm may also include a manufacturing mechanism of manufacturing the wire via receiving the deformed data of the wire measured by an additional measuring unit.

Accordingly, the compensation algorithm of the present example embodiment is the wire compensation algorithm considering the elastic restoring force of the wire in manufacturing the dentition maintenance process, but actually may be the entire manufacturing mechanism for manufacturing the wire for the dentition maintenance process additionally considering the elastic restoring force.

Hereinafter, referring to FIGS. 5 and 6, a method for manufacturing the orthodontic wire using the system explained referring to FIGS. 1 to 4, is explained.

Figure 5:
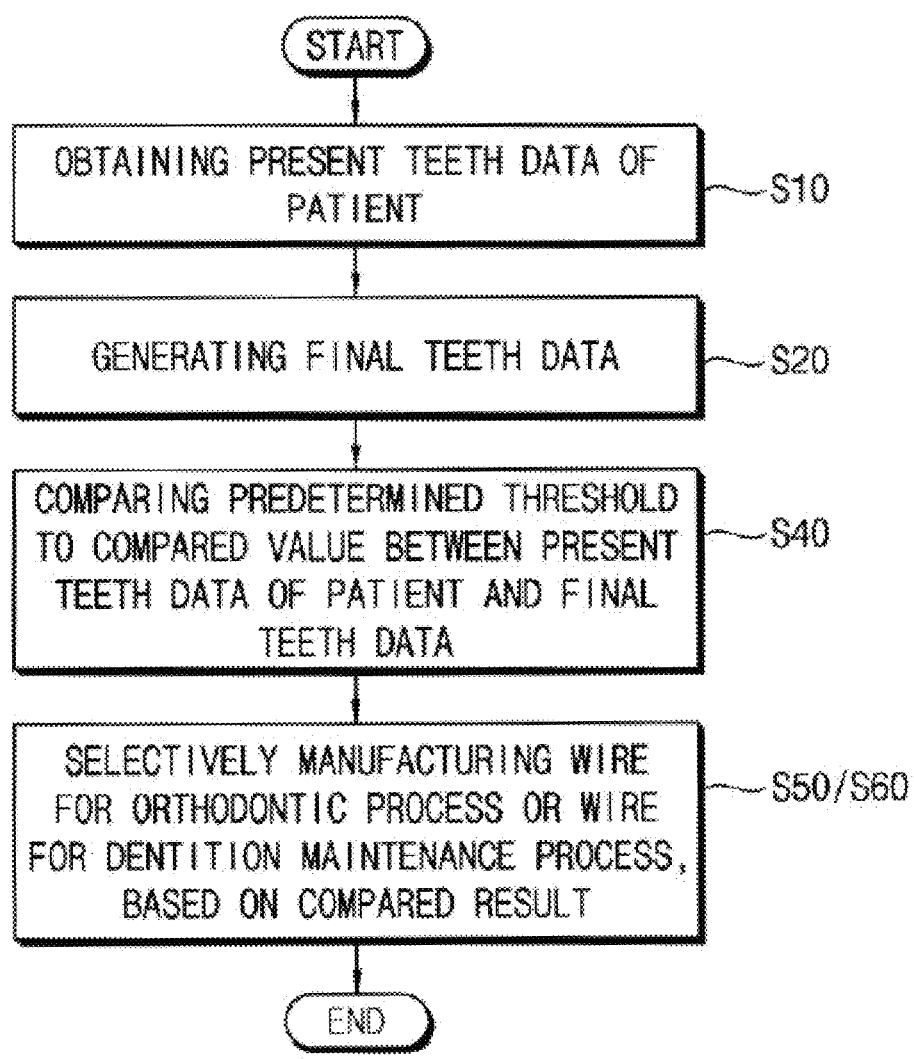
FIG. 5 is a flow chart illustrating a method for manufacturing the orthodontic wire using the system of FIG. 1.

FIG. 5 is a flow chart illustrating a method for manufacturing the orthodontic wire using the system of FIG. 1. FIG. 6 is a flow chart illustrating the method for manufacturing the orthodontic wire of FIG. 5 in detail.

Figure 6:
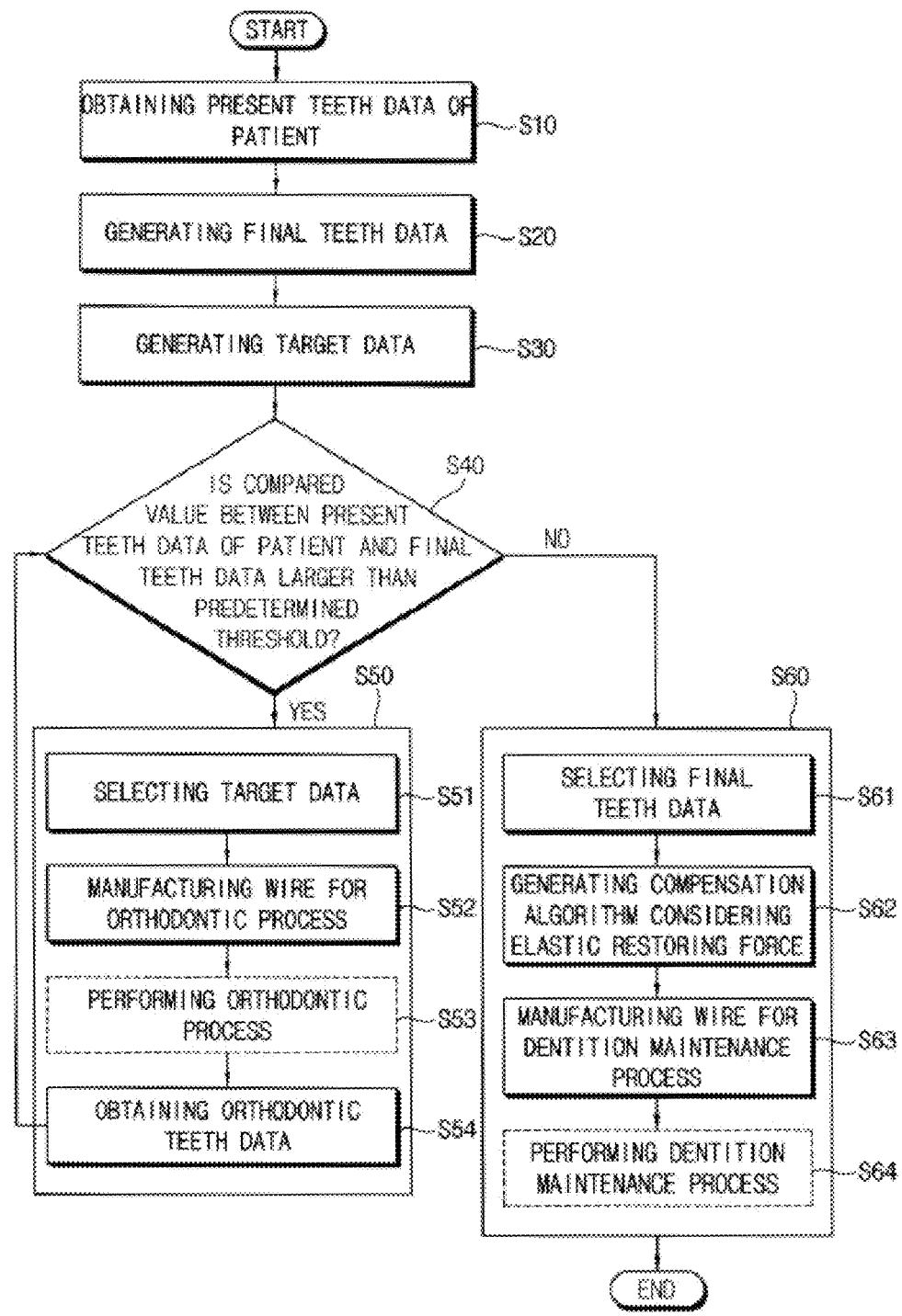
FIG. 6 is a flow chart illustrating the method for manufacturing the orthodontic wire of FIG. 5 in detail.

Referring to FIGS. 5 and 6, in the method for manufacturing the orthodontic wire, the present teeth data of the patient is obtained (step S10).

Here, the obtained data are the present teeth data 11 of the patient before the orthodontic process.

However, in comparing the predetermined threshold, the orthodontic teeth data 12 after each of the orthodontic steps is considered as the present teeth data 11 of the patient, and then is compared to the threshold.

Then, the final teeth data are simulated and generated (step S20).

Here, the obtaining the present teeth data of the patient and the generating the final teeth data are substantially same as mentioned above.

The target data are generated based on the obtained present teeth data 11 of the patient and the generated final teeth data 21 (step S30).

In the present example embodiment, the target data are first to n-th target data 31, 32, . . . , 33 of each of the orthodontic steps from the present teeth data 11 to the final teeth data 21, and the number of the orthodontic steps may be determined variously based on the state of the patient and so on.

In addition, the first to n-th target data 31, 32, . . . , 33 of each of the orthodontic steps are stored to be the reference data for manufacturing the wire for the orthodontic process matching each of the orthodontic steps.

Then, the present teeth data 11 of the patient is compared to the final teeth data 21, and then the compared value is compared to the predetermined threshold 51 (step S40).

Here, the present teeth data 11 of the patient may be the teeth data before the orthodontic process is started, and may be the orthodontic teeth data 12 of the patient at the end of each of the orthodontic steps during the orthodontic process is performed.

However, the present teeth data 11 of the patient in the step S30 may be the teeth data before the orthodontic process is started, since the overall steps of the orthodontic process are planned in the step S30.

Thus, the present teeth data 11 of the patient is compared to the final teeth data 21, and then the compared value is compared to the predetermined threshold 51.

Here, the threshold 51 is the same as mentioned above, and thus repetitive explanation is omitted. When the compared value between the present teeth data 11 of the patient and the final teeth data 12 is larger than the predetermined threshold 51, the wire for the orthodontic process is manufactured (step S50). Alternatively, the compared value between the present teeth data 11 of the patient and the final teeth data 12 is less than the predetermined threshold 51, the wire for the dentition maintenance process is manufactured (step S60).

Hereinafter, the manufacturing the wire for the orthodontic process (step S50) is explained.

In the step S50, firstly, the target data is selected, form the target data 31, 32, . . . , 33 of each of the orthodontic steps (step S51).

For example, in the selecting the target data (step S51), when the orthodontic process is started, in other words, when the present teeth data 11 of the patient is the initial patient teeth data before the orthodontic process, the first target data 31 may be selected as the target data among the first to n-th target data 31, 32, . . . , 33.

Alternatively, in the selecting the target data (step S51), when the orthodontic process is in process, in other words, when the present teeth data of the patient is the orthodontic teeth data 12 after any of the orthodontic steps, the target data may be selected by comparing the orthodontic teeth data 12 to the first to n-th target data 31, 32, . . . , 33.

Here, in selecting the target data, after the comparing, the target data the closest to the final teeth data 21 may be selected.

For example, referring to FIG. 4 again, when the orthodontic teeth data is the closest to the first target data 31 and the orthodontic teeth data is more processed than the first target data 31, the second target data 32 may be selected to be the target data in the selecting the target data (step S51).

Alternatively, when the orthodontic teeth data is the closest to the second target data 32 and the orthodontic teeth data 12 is less processed than the second target data 32, the second target data 32 may be selected to be the target data or the third target data may be selected to be the target data based on the similarity between the orthodontic teeth data 12 and the second target data 32, in the selecting the target data (step S51).

Accordingly, after the target data is selected, the wire for the orthodontic process is manufactured based on the target data (step S52).

Then, the orthodontic process is performed using the manufactured wire (step S53), and then after the orthodontic step is finished, the wire is removed and the orthodontic teeth data 12 is obtained (step S54).

Here, the method for obtaining the orthodontic teeth data of the patient is substantially same as that for obtaining the present teeth data of the patient (step S10). Here, the orthodontic teeth data 12 of the patient is considered as the present teeth data of the patient, and is compared to the final teeth data 21 in the comparing the predetermined threshold (step S40).

The manufacturing the wire mentioned above (step S50) is repeated, and then is finally finished when the compared value between the present teeth data of the patient and the final teeth data is less than the threshold 15.

Thus, after the manufacturing the wire for the orthodontic process (step S50) is finished, the manufacturing the wire for the dentition maintenance process (step S60) is started, and further detailed explanation is as followed.

In the manufacturing the wire for the dentition maintenance process (step S60), firstly, the final teeth data is selected to be the target data (step S61).

In manufacturing the wire for the dentition maintenance process, the orthodontic process is finished, and thus any of the target data of the orthodontic steps is unnecessary to be selected and the final teeth data is to be selected as the target data.

Here, in the dentition maintenance process, since the compared value between the present teeth data of the patient and the final teeth data is less than the threshold, the present teeth data may be substantially same as or similar to the final teeth data.

For example, when manufacturing the wire for the dentition maintenance process, the final teeth data 21 selected as the target data may be substantially same as or similar to the present teeth data (the orthodontic teeth data) of the patient after the orthodontic process is finished.

Then, the compensation algorithm considering the elastic restoring force of the wire for the dentition maintenance process is generated (step S62).

The wire for the dentition maintenance process functions to maintain the set of teeth of the patient after the orthodontic process is finished, and thus the manufactured wire should not be deformed or should be less deformed to uniformly maintain the set of teeth of the patient.

Thus, in manufacturing the wire for the dentition maintenance process, the compensation algorithm should be generated considering the elastic restoring force. For example, the compensation algorithm is generated using predetermined elastic restoring force data based on kinds of the wires for the dentition maintenance process, for example, a material, a thickness, a length and so on of the wire. Here, the predetermined elastic restoring force data may be obtained by an additional reference or by an experiment of the elastic restoring force, as mentioned above.

Then, the wire for the dentition maintenance process is manufactured based on the compensation algorithm and the final teeth data selected as the target data (step S63).

Here, the amount of deformation of the wire includes the amount of deformation compensated by the compensation algorithm in addition to the amount of deformation based on the final teeth data, and may be variously determined based on the elastic restoring force of the wire.

Then, the dentition maintenance process is performed using the wire for the dentition maintenance process (step S64), and then entire orthodontic treatment is completed.

Figure 7:
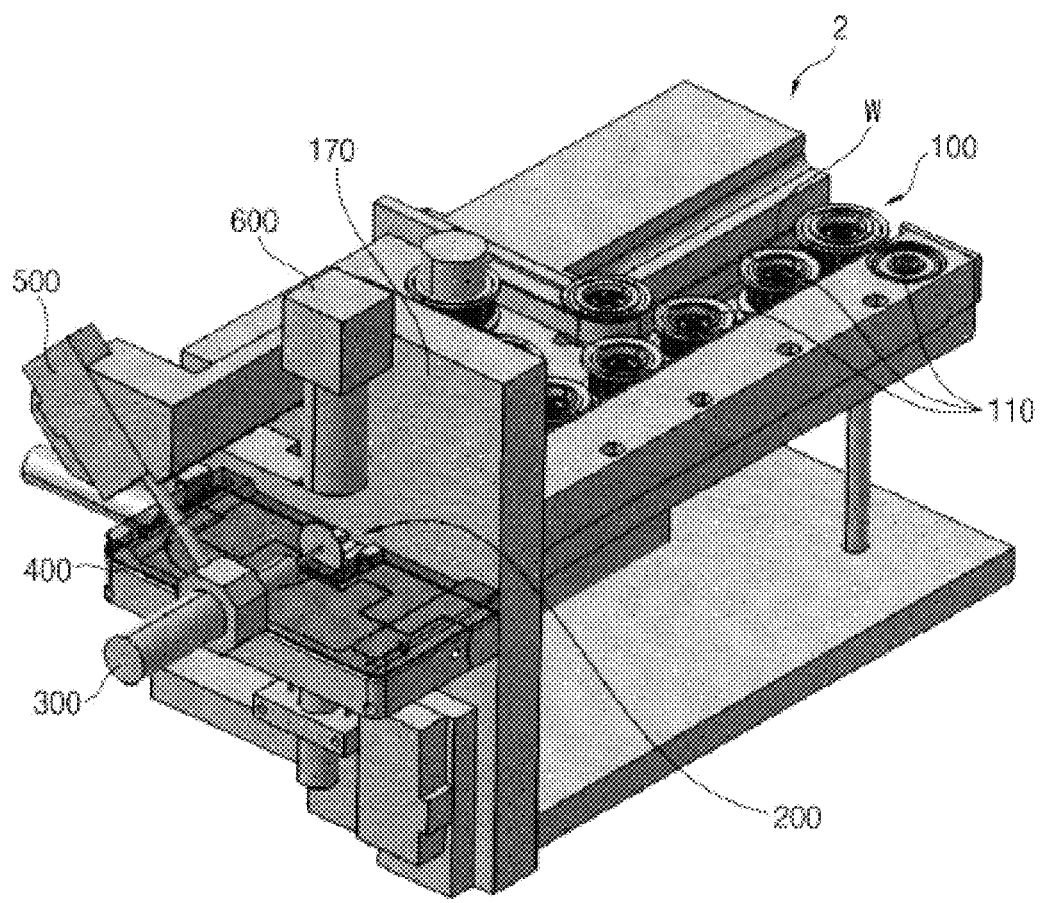
FIG. 7 is a perspective view illustrating an orthodontic wire bending machine for performing the system of FIG. 1.
Figure 8:
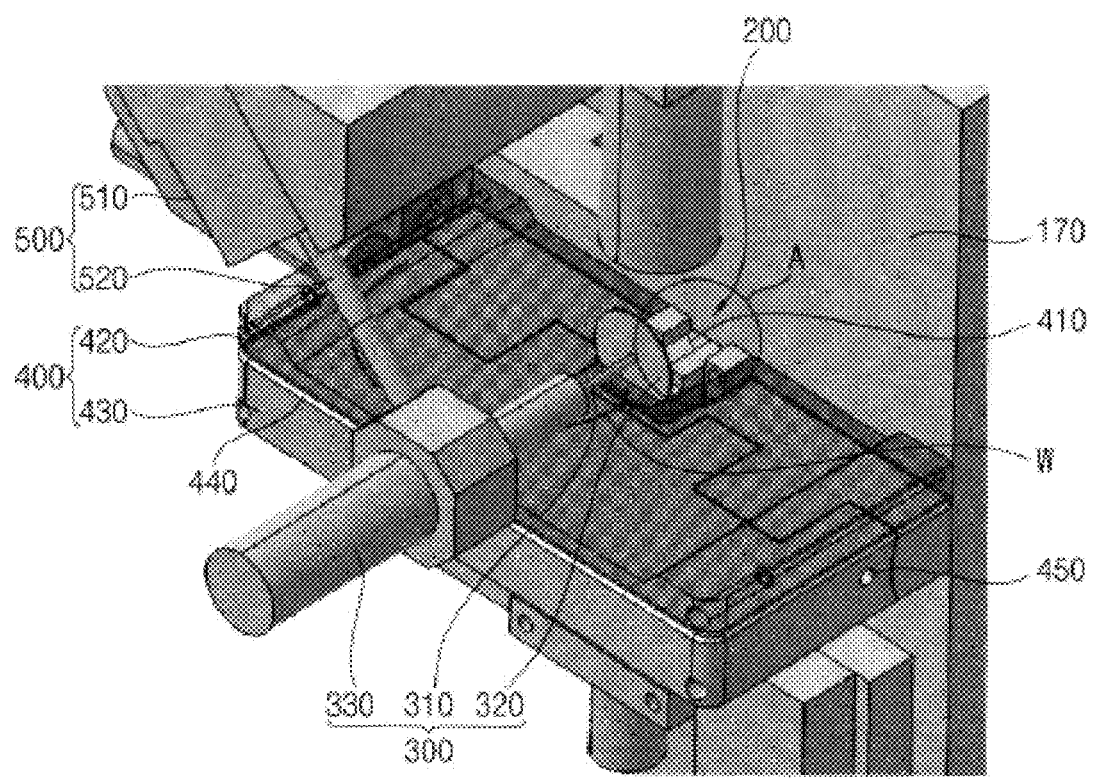
FIG. 8 is a plan view illustrating a bending unit of the orthodontic wire bending machine in FIG. 7.
Figure 9:
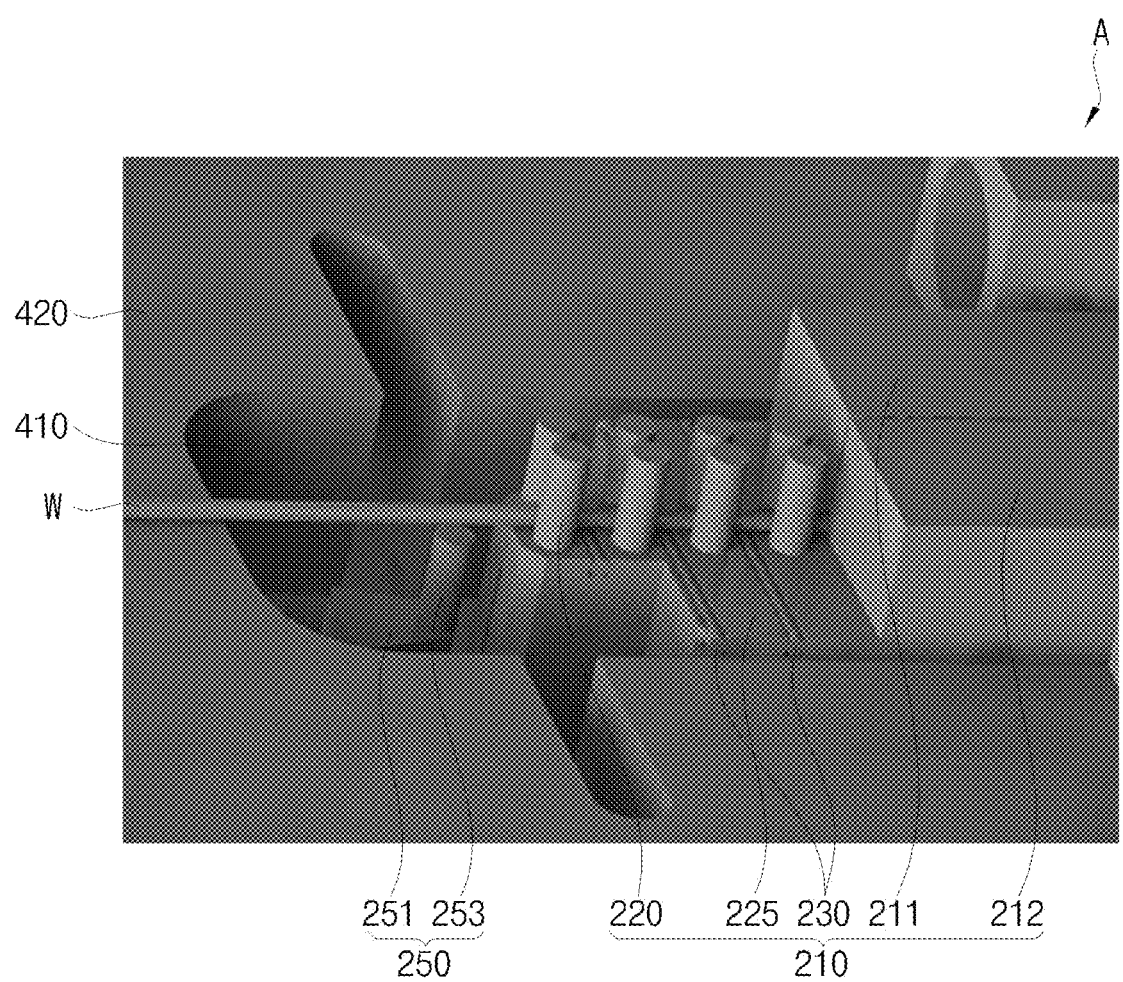
FIG. 9 is an enlarged perspective view of a portion 'A' in FIG. 8.

FIG. 7 is a perspective view illustrating an orthodontic wire bending machine for performing the system of FIG. 1. FIG. 8 is a plan view illustrating a bending unit of the orthodontic wire bending machine in FIG. 7. FIG. 9 is an enlarged perspective view of a portion 'A' in FIG. 8.

Referring to FIGS. 7 and 8, the orthodontic wire bending machine 2 includes a providing unit 100, a bending unit 200, a cutting unit 300, a guide zig 400, a linear moving part 500, a vision feedback controller 600 and a laser heating part (not shown).

The providing unit 100 provides the wire W in a direction. A fixing part 210 of the bending unit 200 disposed at a front of the providing unit 100 fixes the wire, and a bending part (not shown) of the bending unit 200 bends the wire if necessary. The bent wire extends with additionally fixed by the guide zig 400, and then the cutting unit 300 cuts the wire if necessary.

For example, the providing unit 100 includes a plurality of providing rollers 110 guiding the wire, and the providing rollers 110 are disposed along a moving path of the wire. The providing unit 100 provides the wire with a step-moving using the providing rollers 110, which means that the wire is provided intermittently with a predetermined distance.

Here, the providing rollers 110 may rotate by a rotating force of a motor (not shown), and may guide the wire W with the rotation of the providing rollers.

The providing rollers 110 may be connected with each other via a belt as illustrated in FIG. 7, and thus the rotating force of the motor may be provided to the providing rollers 110 continuously. Thus, the providing roller 110 guides the wire.

In addition, a guide groove (not shown) is formed at an outer surface of the providing roller 110, and thus the wire is mounted by the guide groove in the moving. Thus, the wire may be accurately, safely and stably guided by the guide groove, without secession.

The number of the providing rollers and an arrangement of the providing rollers may be changed variously.

Further, although not shown in the figure, the orthodontic wire 2 may further include a sensing part sensing a moving distance of the wire, for deciding whether the wire is provided correctly, and for correcting a length of the wire provided by the providing unit 100.

The wire moving by the providing rollers 110, passes through a sidewall 170 to be provided to the bending unit 200 disposed at a front of the sidewall 170.

Referring to FIG. 9, the bending unit 200 includes a fixing part 210 and a bending part 250.

The fixing part 210 is disposed at a front of the providing unit 110 in a moving path of the wire, and disposed at a front of the sidewall 170. The fixing part 210 fixes the wire provided from the providing unit 100.

The fixing part 210 includes first and second zigs 211 and 212, a distance control element (not shown), a pair of fixing tips 220, a fixing plate 225 and a guide pin 230.

The first and second zigs 211 and 212 face with each other and the wire is disposed between the first and second zigs 211 and 212. The first and second zigs 211 and 212 guide a feeding of the wire.

The pair of fixing tips 220 are disposed at both sides of the wire extended from the first and second zigs 211 and 212, and are disposed between bending bars explained below. For example, the pair of fixing tips 220 are disposed at the front of the first and second zigs 211 and 212, to fix the wire.

In addition, at least two pairs of fixing tips 220 may be disposed, as illustrated in FIG. 9, and each of the pair of fixing tips 220 fixes the wire at both sides of the wire to increase the fixing force and the stability of the fixing.

Accordingly, when at least two pairs of fixing tips 220 are disposed, the pair of fixing tips 220 closer to the bending bar may be a rotational axis when the wire is bent.

Although not shown in the figure, the fixing part 210 may further include the distance control element moving the first and second zigs 211 and 212 toward the wire.

Further, each of the fixing tips 220 has a cylindrical shape and has a circumferential outer shape, so that the wire is not interfered by the fixing tips 220 when the wire is extruded from the first and second zigs 211 and 212.

The distance control element controls the distance between the first and second zigs 211 and 212. When the wire is disposed between the first and second zigs 211 and 212, the distance between the first and second zigs 211 and 212 may be controlled by the distance control element.

Thus, the first and second zigs 211 and 212 moves toward the wire by the distance control element, and thus the wire is gripped or fixed by the first and second zigs 211 and 212.

The distance control element may be automatically controlled, and thus the wire may be properly fixed or gripped by the first and second zigs 211 and 212.

The fixing plate 225 has a plate shape as illustrated in the figure. The pair of fixing tips are positioned on the fixing plate 225, and the wire is supported by the fixing plate 225 disposed beneath the wire. The fixing plate 225 prevents the wire from being seceded from the first and second zigs 211 and 212 and also prevents the wire from being moving downwardly or sagging.

In addition, a groove (not shown) is formed at an upper surface of the fixing plate 225. The groove extends substantially perpendicular to the feeding direction of the wire, and the guide pin 230 is inserted at the groove.

Here, the guide pin 230 has a circular rod shape and extends substantially perpendicular to the feeding direction of the wire, and thus the wire partially makes contact with the guide pin 230 when the wire is moving on the fixing plate 225 and contacting with the fixing plate 225. Thus, the moving of the wire is prevented from being interfered with the fixing plate 225.

Here, the number of the guide pins 230 formed on the fixing plate 225 may be variously changed.

Further, when the guide pin 230 is inserted into the groove formed at the upper surface of the fixing plate 225 and is rotated along a direction, the wire makes contact with the rotated guide pin 230 to be guided, and thus the wire may be transferred more easily.

Furthermore, the bending part 250 of the bending unit 200 bends the wire with the wire fixed by the first and second zigs 211 and 212. For example, the wire may be bent based on predetermined direction and rotation with a predetermined amount, considering the state of the teeth of the patient, by the bending part 250.

After the wire is bent, the bent portion of the wire advances to the front of the first and second zigs 211 and 212, and is positioned in front of the first and second zigs 211 and 212.

The bending part 250 includes a base 251 and a bending bar 253.

The base 251 has a circular plate shape with a predetermined thickness, for example, a cylindrical shape.

The bending bar 253 is protruded from the base 251, and moves along a circumferential direction of the base 251 for the bending of the wire.

Here, the bending bar 253 is disposed at a side of the wire, and bends the wire along a direction (for example, a clockwise direction). Alternatively, when the wire is bend along an opposite direction (for example, a counterclockwise direction), the bending bar 253 should be disposed at an opposite side of the wire.

Thus, the bending bar 253 moves along a vertical direction (downward), with protruded from the base 251, and is inserted into a hole. Then, the bending bar 253 rotates with the rotation of the base 251, and moves along a vertical direction (upward) to be protruded from the hole. Thus, the bending bar 253 is in the position for bending the wire along the opposite direction.

Accordingly, the bending bar 253 is inserted into and protruded from the hole formed through the base 251, and moves along the vertical direction (downward and upward).

Thus, the single bending bar 253 may bend the wire, with selectively positioned at both sides of the wire.

Thus, the wire is prevented from being interfered with the bending bar 253, and thus the wire may be bent with more increased angle, and various kinds of bending angles may be applied to the wire. Thus, the wire may be bent variously.

Further, the bending bar 253 may move along the feeding direction of the wire. Thus, when the wire is rotated by the bending bar 253, a rotational center of the wire may be changed.

For example, when the bending bar 253 is positioned closer to the fixing tips 220 of the fixing part 210, the rotational center of the wire may be closer to the fixing tips 220. Alternatively, when the bending bar 253 is positioned far from the fixing tips 220, the rotation center of the wire may be far from the fixing tips 220.

Accordingly, the wire is bent by the bending part, and then the wire is cut.

Here, the cutting unit 300 moves by the linear moving part 500, and as illustrated in the figure, the cutting unit 300 moves toward the wire and then cuts the wire. After cutting, the cutting unit 300 moves backward from the wire by the linear moving part 500, and is positioned at an initial position.

Thus, the wire unit bent with a predetermined shape, is cut by the cutting unit 300, and then is formed as the wire for the orthodontic process or the wire for the dentition maintenance process.

Figure 10:
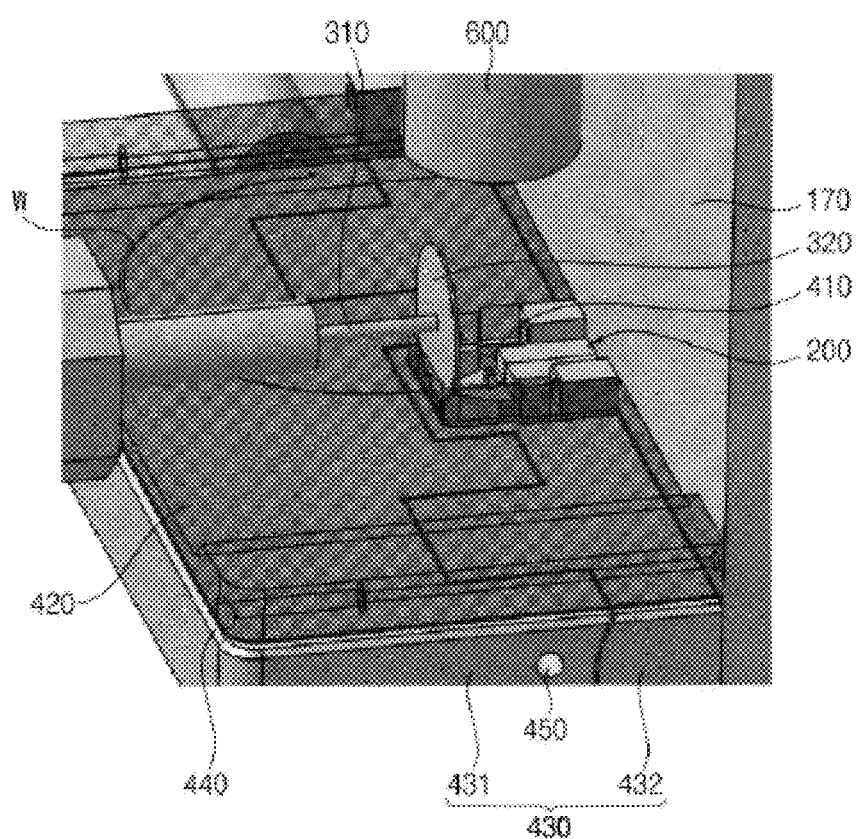
FIG. 10 is enlarged perspective view illustrating the bending unit, a cutting unit and a guide zig of the orthodontic wire bending machine in FIG. 7.

FIG. 10 is enlarged perspective view illustrating the bending unit, a cutting unit and a guide zig of the orthodontic wire bending machine in FIG. 7.

Referring to FIG. 10, the cutting unit 300 includes a rotating axis 310, a cutting element 320 and a body element 330, and the linear moving part 500 includes a linear motor 510 and a combining element 520.

The linear motor 510 generates a linear moving force, and the combining element 520 is combined with the cutting unit 300 to provide the linear moving force to the cutting unit 300. As illustrated in the figure, the combining element 520 diagonally extends to linearly move the cutting unit 300 diagonally.

For example, the cutting unit 300 may be disposed at an upper side of a diagonal direction with respect to the cutting point. The linear motor 510 and the cutting unit 300 are connected by the combining element 520, and thus the cutting unit 300 moves diagonally.

In the present example embodiment, the vision feedback controller 600 is positioned over the cutting point, and thus the cutting unit 300 is designed to move diagonally for guaranteeing a moving space of the cutting unit 300. Thus, the moving direction and the position of the cutting unit 300 may be changed variously.

The cutting element 320 has a circular shape and is rotated with respect to the rotating axis 310 for the cutting, and the body element 330 extends along an extending direction of the rotating axis 310. The body element 330 is combined with the rotating axis 310 and provides the rotating force to the rotating axis 310. A side of the body element 330 is combined with the combining element 520 to receive a linear moving force from the combining element 520.

Here, the cutting element 320 may be rotated to cut the wire, like a grinder.

Accordingly, the cutting unit 300 and the linear moving part 500 are equipped. Thus, the cutting unit 300 moves along the extending direction of the linear moving part 500, and thus the cutting unit 300 moves toward the wire for the cutting, and move backward from the wire by the linear moving part 500 after the cutting such that an additional bending may not be interfered by the cutting unit 300.

The guide zig 400 is positioned at a front of the sidewall 170, which is a front of the providing unit 300, and extends along the feeding direction of the wire with a plate shape. Here, the guide zig 400 includes a guide groove 410, and upper and lower zigs 420 and 430 overlapping with each other.

The upper and lower zigs 420 and 430 extend substantially perpendicular to the sidewall 170 of the providing unit 100. The guide groove 410 is formed between the sidewall 170 and the upper and lower zigs 420 and 430, and thus the bending unit 200 is positioned at the guide groove 410.

In addition, the upper and lower zigs 420 and 430 overlaps with each other to form a predetermined gap between the upper and lower zigs 420 and 430, and thus the wire bent by the bending unit 200 is extended and fixed between the upper and lower zigs 420 and 430.

Here, the size of the gap formed between the upper and lower zigs 420 and 430 may be changed variously considering the thickness of the wire and so on.

Accordingly, when the wire is extended with a continuous bending, the bent portion of the wire is fixed and positioned between the upper and lower zigs 420 and 430, and thus the distortion or the deformation of the wire upwardly or downwardly is prevented even though the wire is continuously bent. Thus, the wire is maintained stably with an initial bent shape.

The lower zig 430 includes first and second lower elements 431 and 432 detachably combined with each other with respect to an interface 440.

Here, the first and second lower elements 431 and 432 are combined and connected with each other through a rotating element 450. The rotating element 450 is formed adjacent to the interface 440 and passes through the first lower element 431.

The first lower element 431 rotates with respect to the second lower element 432 through the rotating element 450, with the second lower element 432 being combined and fixed to the sidewall 170. When the first lower element 431 rotates with respect to a side surface on which the rotating element 450 is formed, the first and second lower elements 431 and 432 are detached from each other with respect to the interface 440. Thus, the wire fixed between the upper and lower zigs 420 and 430 moves downwardly.

Thus, the bent wire moves downwardly to a tray or a storage (not shown), and then is transferred to outside, as the first lower element 431 rotates with respect to the second lower element 432.

The upper zig 420 includes a transparent material, and the lower zig 430 includes an opaque material, and thus the wire extending between the upper and lower zigs 420 and 430 may be visible.

The vision feedback controller 600 is disposed over the upper zig 420, and observes the bent wire through the transparent upper zig 420. Thus, when the wire is not bent as designed, the vision feedback controller 600 controls the bending through a feedback control.

The vision feedback controller 600 includes an optical unit confirming whether the wire is bent as designed in real-time, and thus controls an amount of the bending, an angle of the bending and so on, in real-time.

Further, the vision feedback controller 600 transfers information on the amount of the bending, the angle of the bending to an outer system (not shown), and the outer system decides whether an additional bending is necessary or not.

Although not shown in the figure, the laser heating part is disposed over the bending unit 200, and locally melts the wire disposed at the guide groove 410 and fixed by the pair of the fixing tips of the bending unit 200. The melting is performed locally at the bending portion of the wire, and thus the bending may be performed more easily.

Here, the laser heating part applies an energy enough to maintain an entire shape of the wire. Thus, the locally melted wire may be bent by the bending part, more easily and more accurately as designed.

The wire is for the orthodontic process, and thus has a relatively high strength. Thus, the wire should be bent repeatedly to be bent as designed. Here, the local melting may locally release or decrease the strength of the portion of the wire, and thus less number of bending may form the wire as designed and the bending process may be performed more easily and more efficiently.

According to the present example embodiments, it is decided whether an orthodontic process is necessary or a dentition maintenance process is necessary, based on a state of patient teeth, and a wire matching with the decision is manufactured. Thus, more suitable treatment may be performed and the orthodontic treatment may be more effective.

Here, target data are generated corresponding to each orthodontic step, and a proper step is determined based on the state of the patient teeth and the target data corresponding the proper step are generated to manufacture a proper orthodontic wire. Thus, technical features of the orthodontic treatment in which a plurality of steps, not a single step, is necessary to complete the orthodontic treatment, are considered and thus the orthodontic treatment may be more effective.

In addition, in a real orthodontic treatment, the orthodontic process may be further performed than expected or targeted, and thus at the end of each orthodontic step, the state of the patient teeth is compared with a predetermined threshold and then it is decided whether the orthodontic process is necessary or the dentition maintenance process is necessary. Thus, the proper wire may be manufactured considering the state of the patient teeth, and the orthodontic treatment may be more effective.

Here, regarding characteristics of the wire used in the real orthodontic treatment, more proper wire may be manufactured considering that an elastic restoring force of the wire used at the dentition maintenance process is higher than that of the wire used at the orthodontic process. Thus, the orthodontic treatment may be more effective.

In other words, in the dentition maintenance process, the maintenance of the dentition is the final target and thus the wire should be manufactured considering the elastic restoring force of the wire. Thus, the wire may be previously prevented from being distorted or deformed to enhance the effect of the dentition maintenance process.

Here, considering the elastic restoring force of the wire, various kinds of data may be used according to a kind of the wires used for the dentition maintenance, and thus compensated algorithm may be generated more correctly.

Further, according to the orthodontic wire bending machine of the present example embodiment, a guide groove is formed around a providing roller so that the wire is mounted on the guide groove, a position of the wire is not changed and the wire move stably without secession.

In addition, each of first and second zigs of a fixing part fixes the wire, so that the wire is fixed more stably. A distance between the first and second zigs may be controlled by a distance control unit, so that various kinds of wire having various kinds of diameters may be easily fixed. Thus, the wire for the orthodontic treatment may be manufactured more easily, more cheaply and more efficiently.

In addition, a cutting unit cutting the wire is combined with a linear moving part, and thus the cutting unit moves by the linear moving part. Thus, the cutting unit moves toward the wire for cutting, and moves from the wire after cutting, and thus the cutting unit does not interfere the bending mechanism of the wire.

In addition, the upper and lower zigs overlapping with each other and extending from a sidewall of the providing unit, forms a guide groove at which the bending unit is positioned, and thus bent portions of the wire may be fixed between the upper and lower zigs. Thus, the wire is prevented from being sagging after being bent, and a shape of the bent wire is maintained without being additionally deformed.

In addition, the lower zig includes first and second lower elements combined with each other and rotating with each other, and thus the first lower element rotates with respect to the second lower element to downwardly move the wire after the bending.

Further, the upper zig has a transparent material, and the lower zig has an opaque material. Thus, the bent wire may be identified through the upper zig, and a vision feedback controller may confirm or control the bending of the wire through the upper zig.

In addition, the wire for the orthodontic process is normally formed by three twisted wires, and thus the wire may be distorted or deformed upwardly or downwardly when the wire is bent to left and right directions. However, in the present example embodiment, the wire is positioned and fixed by the upper and lower zigs, and thus the distortion or the deformation of the wire may be prevented.

In addition, the wire may be formed to have a stereoscopic shape different from the predetermined or intended shape. However, in the present example embodiment, the wire is fixed and positioned between the upper and lower zigs, and thus an energy for the bending is applied only for the predetermined or intended shape of the wire, and the wire may be prevented from being formed to have unexpected or unintended shape.

Furthermore, a laser heating part melts the wire positioned at the guide groove. Here, the laser heating part locally heats a very small portion of the wire, and thus moldability for the wire may be increased and the wire may be bent more accurately and precisely.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A method for manufacturing a wire for an orthodontic process and a wire for a dentition maintenance process, the method comprising:
   obtaining present teeth data of a patient, the present teeth data being indicative of one or more of a position or an orientation of one or more teeth included in the present teeth data before or after the orthodontic process begins;
   generating final teeth data, the final teeth data being indicative of one or more of a goal position or a goal orientation of the one or more teeth included in the present teeth data upon completion of the orthodontic process;
   comparing a predetermined threshold value to a compared value, the compared value being a difference between the present teeth data of the patient and the final teeth data, and the predetermined threshold value being a maximum allowable difference between the present teeth data of the patient and the final teeth data, serving as a reference value for determining whether the orthodontic process is completed; and
   selectively manufacturing (1) the wire for a step of the orthodontic process based on a determination that the orthodontic process should continue (2) the wire for the dentition maintenance process based on a determination that the orthodontic process is completed, wherein
   the determination that the orthodontic process should continue is based on a determination that the compared value is greater than the predetermined threshold value,
   the determination that the orthodontic process is completed is based on a determination that the compared value is less than or equal to the predetermined threshold value,
   the orthodontic process causes one or more of the position or the orientation of the one or more teeth included in the present teeth data to be changed, and
   the detention maintenance process causes one or more of the position or the orientation of the one or more teeth included in the present teeth data to be maintained.

2. The method of claim 1, further comprising generating target data at each step of the orthodontic process based on the present teeth data of the patient and the final teeth data.

3. The method of claim 1, wherein manufacturing the wire for the orthodontic process comprises:
   selecting the target data of the patient, from the target data at each step of the orthodontic process;
   manufacturing the wire for the orthodontic process, based on the target data of the patient; and
   obtaining the target data of the patient after each step of the orthodontic process is finished.

4. The method of claim 3, further comprising:
   considering the obtained target data of the patient after each step of the orthodontic process is finished as the present teeth data of the patient, and then comparing the predetermined threshold to the compared value between the present teeth data of the patient and the final teeth data again.

5. The method of claim 3, wherein in selecting the target data of the patient, the target data closest to the final teeth data are selected, by comparing the present teeth data of the patient to the target data at each step of the orthodontic process.

6. The method of claim 1, wherein manufacturing the wire for the dentition maintenance process comprises:
   selecting the final teeth data as the target data of the patient;
   generating a compensation algorithm considering an elastic restoring force of the wire for the dentition maintenance process; and
   manufacturing the wire for the dentition maintenance process, based on the final teeth data and the compensation algorithm.

7. The method of claim 6, wherein in generating the compensation algorithm, the compensation algorithm is generated by using predetermined elastic restoring force data based on kinds of the wires for the dentition maintenance process.

* * * * *